United States Patent [19]

Babcock

[11] Patent Number: 4,939,820
[45] Date of Patent: Jul. 10, 1990

[54] ROPE FASTENER

[76] Inventor: Martin P. Babcock, 2622 Guthrie Ave., N., Oakdale, Minn. 55119

[21] Appl. No.: 292,906

[22] Filed: Jan. 3, 1989

[51] Int. Cl.$^5$ ............................................. F16G 11/00
[52] U.S. Cl. .................................. 24/129 R; 24/129 B
[58] Field of Search ............ 24/129 R, 129 B, 129 A, 24/129 D, 130, 115 H, 136 R

[56] References Cited

U.S. PATENT DOCUMENTS

| | | | |
|---|---|---|---|
| 278,097 | 5/1883 | Collins | 24/129 B |
| 1,426,537 | 8/1922 | Bauer | 24/130 |
| 1,929,843 | 10/1933 | Gaus | 24/129 B |
| 2,309,971 | 2/1943 | McLarn | 24/129 B X |
| 2,418,885 | 4/1947 | Houston | 24/129 B |
| 2,458,252 | 1/1949 | Chatterton | 24/129 B |
| 4,355,444 | 10/1982 | Haney | 24/129 B |

FOREIGN PATENT DOCUMENTS

| | | | |
|---|---|---|---|
| 360945 | 5/1906 | France | 24/130 |
| 460714 | 2/1937 | United Kingdom | 24/129 B |

*Primary Examiner*—Laurie K. Cranmer
*Attorney, Agent, or Firm*—Douglas L. Tschida

[57] ABSTRACT

A knotless cordage coupler for releasably securing a pair of cord ends to one another. The coupler in one construction comprises a planar member including a pair of rope end receiving apertures formed along a longitudinal axis of the member. A plurality of staggered wedging notches extend inward along the peripheral edges of the coupler to receive a wrapped cord end and maintain the rope ends in secured parallel alignment with the longitudinal axis. In another construction, a tubular body includes opposite wedging notches and an open flange for receiving the tag end.

6 Claims, 5 Drawing Sheets

ROPE FASTENER

BACKGROUND OF THE INVENTION

The present invention relates to rope fasteners and in particular to a knotless coupler for securing at least a pair of cord ends to one another.

A perpetual problem plaguing all individuals whoever desire to secure a pair of rope ends to one another is that of how best to achieve a secure bond between the cords, yet one which is easily released at a later time. In preference to knotting the cords to themselves, varieties of intermediate couplers have been developed over the years to achieve these ends. Some of such couplers of which Applicant is aware are disclosed in U.S. Pat. Nos. 4,355,444; 3,736,925 and 656,431. Each of these patents discloses devices including wedging slots for controlling the length of the cord by way of forming a loop of variable length along the cord. U.S. Pat. No. 3,714,923 also discloses a marker device which may be wrap mounted to a length of line and slid there along to mark a predetermined point along the line.

Applicant is also aware of U.S. Pat. Nos. 3,953,911; 3,675,276; 1,426,537; 1,390,152; 1,383,665; 703,018; 402,786 and 278,097. Each of these patents disclose various fastners including one or more apertures and/or wedging notches which variously mount in different orientations to one another for securing two cord ends to each other. Although including wedging slots, nowhere do any of such devices suggest a planar member including opposite end apertures and intermediate of which along opposite peripheral edges are formed alternating staggered wedging slots. Additionally nowhere do any of such references include a projecting loop member and/or a tubular body member having an open inner center bore.

Applicant has therefore developed yet another coupler construction which releasably secures two cord ends to one another, whether or not under tension. The tag end of the bound cords is additionally restrained to prevent against slippage of the bond over time. The coupler finds particular advantage for cinching tarps, boat covers, guy ropes and the like.

SUMMARY OF THE INVENTION

It is accordingly a primary object of the present invention to provide a knotless fastener which releasably binds two cords to one another, whether or not under tension, while restraining the tag ends.

It is a further object of the invention to provide a coupler having at least a pair of apertures through which the bound cords may be looped.

It is a yet further object of the invention to provide a plurality of alternating wedging notches intermediate the ends of the member for receiving a wrapped cord end wherein the windings form a tubular bond relative to a longitudinal axis of the member and a portion of one cord end covered over with the wrappings.

In one particular and presently preferred embodiment of the invention, the coupler comprises a planar member having one relatively pointed end and an opposite blunt end. A pair of apertures are let through the member adjacent the longitudinal center axis at the opposite ends. The aperture of the pointed end is formed of an enlarged size relative to the other aperture. Extending inwardly along opposite longitudinal peripheral edges, intermediate the apertures are a plurality of V-shaped wedging notches. The edge of each notch is beveled and each opposite, successively occurring notch is staggered relative to each of its opposite neighbor notches to form an essentially flat-thread pattern.

In an alternative embodiment and in lieu of an end aperture, a closed-loop member projects from the coupler to receive a cord end before it is inserted through the other end aperture and once wrapped about the wedging notches.

In still another embodiment, a tubular body having a lengthwise bore includes an aperture through one end wall. Staggered notches are let into opposite sides of the member and either an aperture or flange portion is formed at an opposite end wall.

The foregoing objects, advantages and distinctions of the invention, among others, as well as a detailed description of its construction is presented hereinafter with respect to the appended drawings. Before referring thereto, it is to be appreciate the following description is made by way of one or more presently preferred embodiments only, which description should not be interpreted in limitation of the spirit and scope of the invention claimed hereinafter. To the extent modifications or alternative arrangements may have been considered, they are described as appropriate.

DESCRIPTION OF THE PREFERRED EMBODIMENT

Figure 3:
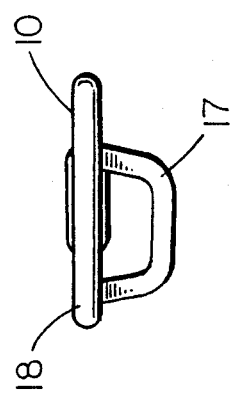
FIG. 3 shows a bottom end view of the coupler.
Figure 2:
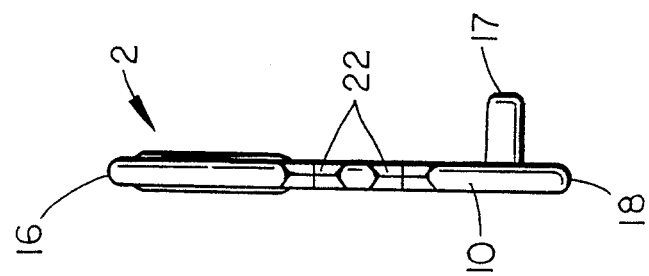
FIG. 2 shows a side view of the coupler.
Figure 1:
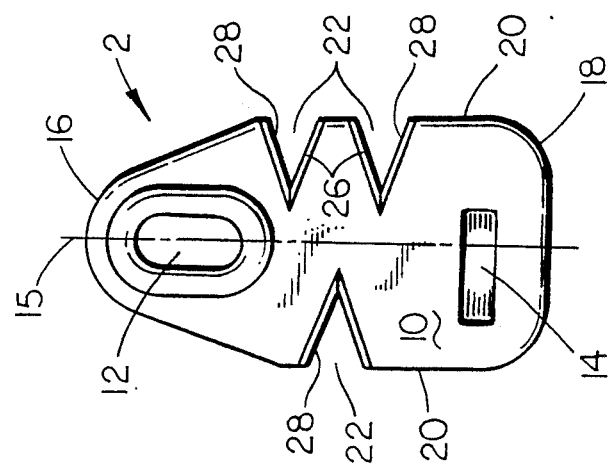
FIG. 1 shows a plan view of the present coupler in secured relation to a pair of cord ends.
Figure 4:
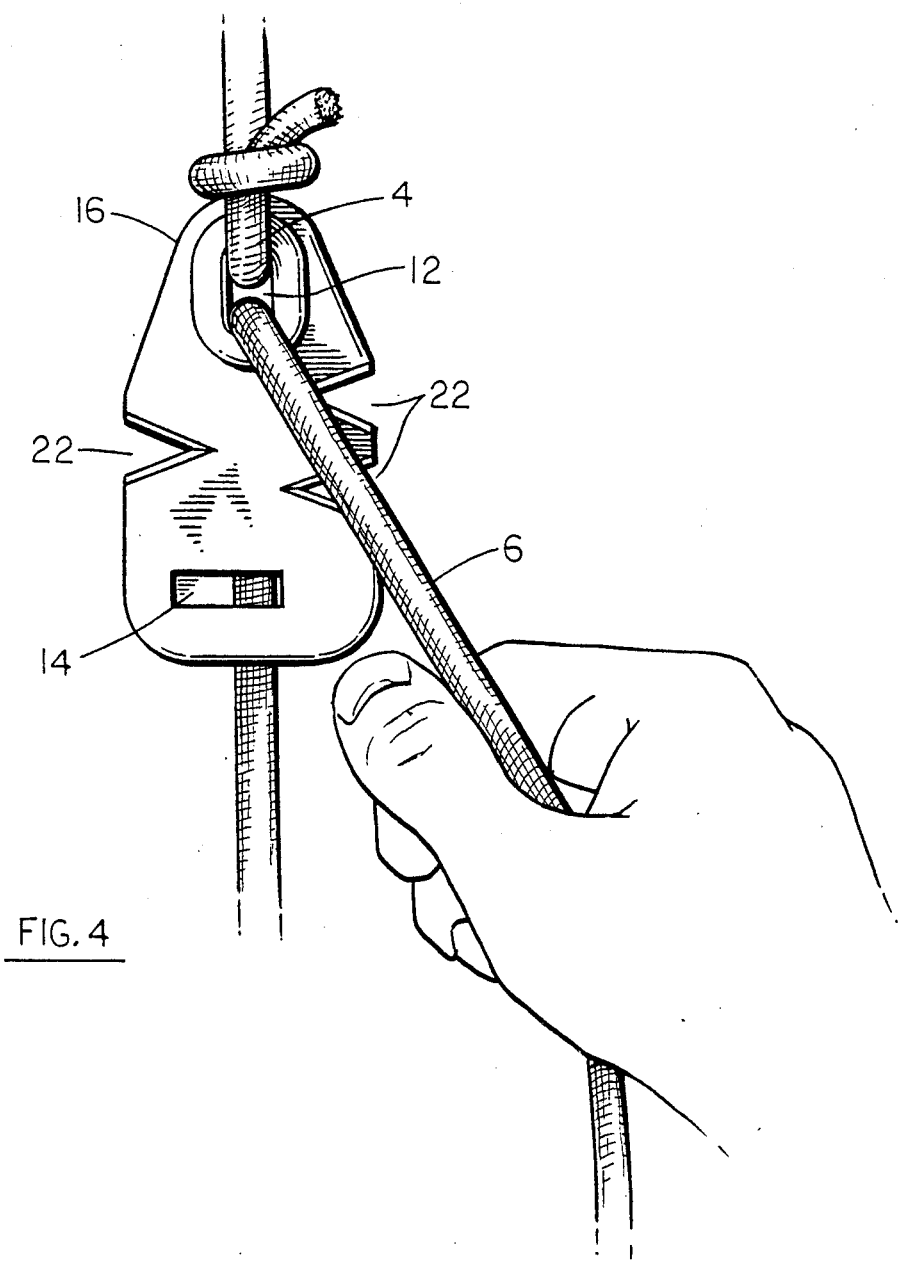
FIG. 4 shows a front plan view in relation to a pair of cord ends, when first attached to the coupler.
Figure 5:
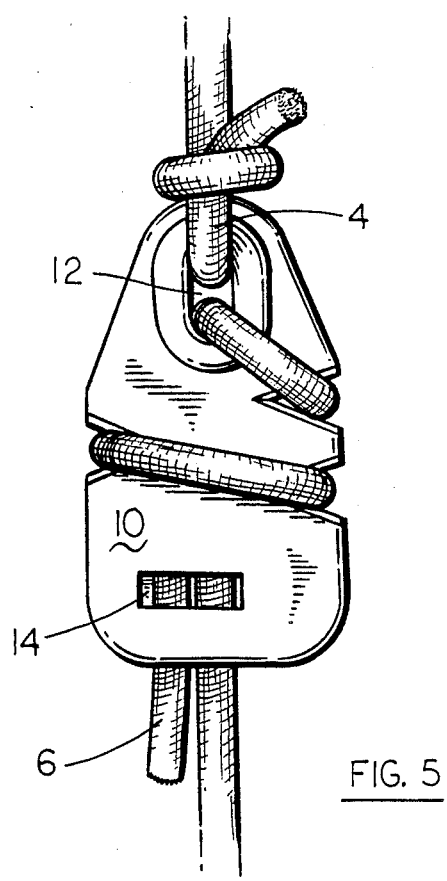
FIG. 5 shows a front plan view of the coupler in bound relation to the wrapped cord ends.
Figure 6:
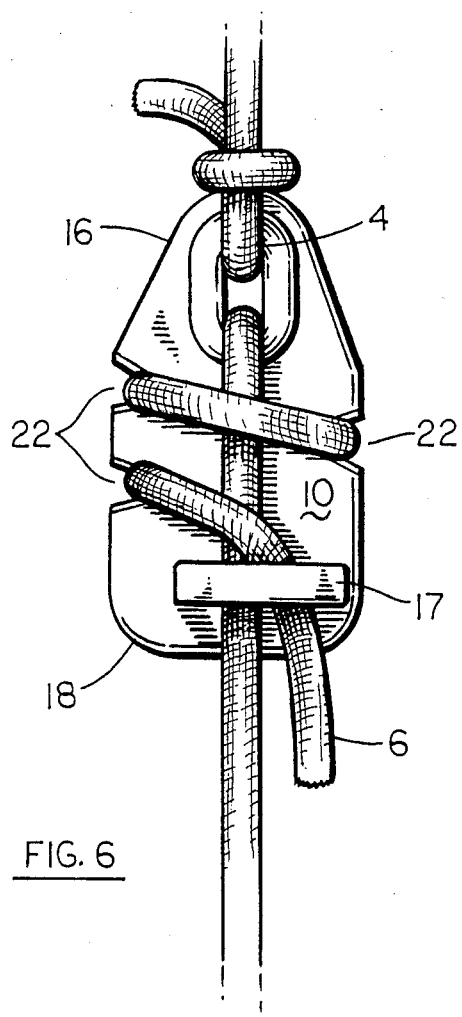
FIG. 6 shows a rear plan view of the bound coupler of FIG. 5.

Referring to FIGS. 1 and 2, a front elevation and side view are shown of the coupler 2. FIG. 3 shows a bottom end view of the coupler. FIGS. 4 to 6, in turn, show how the coupler 2 mounts to the ends 4 and 6 of one or more cord members.

Before referring thereto however attention is first directed to FIGS. 1 through 3 and wherefrom an appreciation can be had of the construction of the coupler 2. From FIG. 1, the coupler 2 is comprised of a planar body member 10 which is of a molded or machined construction and provides for a pair of apertures 12 and 14 formed at opposite ends of the coupler 2 relative to a longitudinal midline axis 15. A loop member 17 also projects from the back of the member. Depending upon the application, the aperture 14 or loop 17 may be deleted.

The periphery of the coupler 2 is shaped to provide a relatively pointed end 16 which surrounds a relatively elongated aperture 12 and a relatively blunt end 18 which surrounds the aperture 14. Let into the opposite side edges 20 of the coupler, intermediate the apertures 12 and 14, are a plurality of V-shaped wedging notches 22, the opposite successively occurring ones of which are lengthwise staggered relative to the other. Bevels 26 are formed into the surface of the coupler 2 along the periphery of each notch 22 to form relatively narrow notch edges 28.

During fastening, the wrapped cord end is compressively received into each of the notches 22, with the cord member deforming about the edges 28 and whereby greater frictional engagement is achieved with each notch 22. It is to be appreciated, however, that the beveling 26 may be deleted for relatively coarse cordage members. The beveled edges 26, moreover, are formed such that they are relatively blunt and will not cut or fray the cordage members.

With attention to FIG. 2, a better appreciation can be had of the construction of the beveled wedging surfaces 26. Additionally, the peripheral edges of the aperture 12 are shown to be thicker than the body 10 which provides additional strength and prevents fraying of looped cord ends secured therethrough. As will become apparent below, the aperture 12 is formed to a relatively larger size than the aperture 14 and, in particular, provides approximately twice the hole area. The increased hole size allows the aperture 14 to receive multiple thicknesses of the cord members, which condition can better be appreciated upon reference to FIGS. 4 through 6.

From FIG. 1, it is also to be appreciated an aperture 14 and loop 17 are formed in the blunt coupler end 18. Depending upon the cord mounting, the aperture 14 may be used to tie-off one cord end, while the loop 17 acts as a guide to retain a cord adjacent the coupler body. If additional anchor points are required, still other apertures can be formed into the coupler body 10 at desired locations and to desired hole sizes. The principal purpose however of the apertures is to provide an attachment point for at least one looped end of the cord. Thus, where some coupler strength is required, an aperture is preferred, whereas the loop 17 of the coupler 2 principally aligns one of the cord members relative to the coupler body 10 and restrains the wrapped tag end.

Turning attention to FIGS. 4 through 6, views are shown of the coupler 2 in its typical mounting relation to the cord which will now be described. From FIG. 4, one end 4 of a cord is looped through the aperture 12 and knotted to itself. The other cord end 6 of either the same or a second cord member is threaded through the loop 17 before it too is passed through the aperture 12. The partially confined end of the cord is next wrapped about the coupler 2 by drawing the cord individually into each of the successively staggered wedging notches 22. As the cord is wrapped about the coupler body and itself and drawn into each notch, the cord is stretched, which action upon release of the cord assures that the cord wraps are partially compressed in each notch 22.

Once the cord is wrapped into each notch, the remaining tag end is threaded back through the loop 17 to secure it against blowing or other lateral movement which might displace the cord from one or more of the notches and weaken the coupling. Twisting and blowing of the coupler is also minimized due to the alignment of the cords 4,6 relative to the longitudinal axis 15 of the coupler 2.

To further ensure the integrity of the coupling and prior to wrapping and pulling the cord into each notch 22, one normally pulls on the cord end 6 to draw the ends 4 and 6 tight relative to one another and the intermediate coupler 2 which for most cording members induces a slight stretching. Thus, when wrapped and released, the cords seek to return to their unstretched shape which creates a counter tension that induces a tighter bond between the cord members and the notches.

Figure 7:
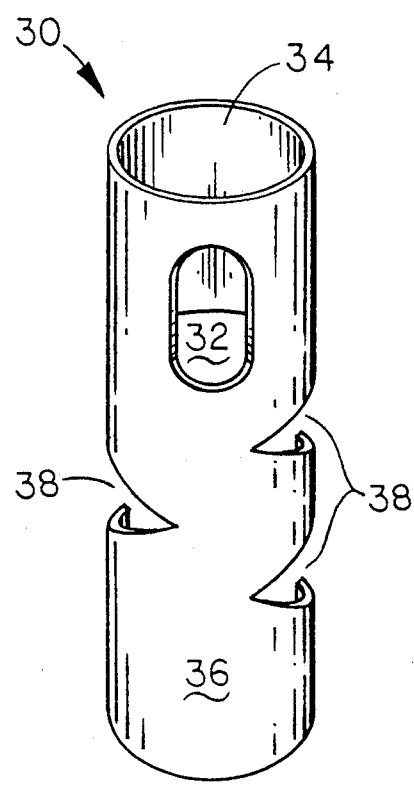
FIG. 7 shows an isometric view of an alternative construction of the coupler.
Figure 8:
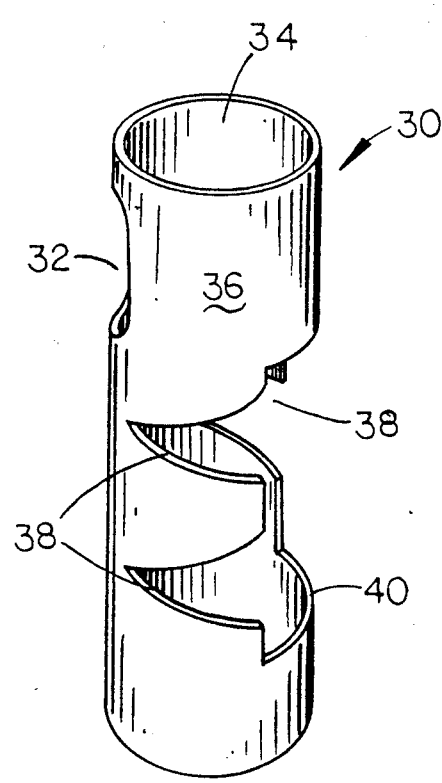
FIG. 8 shows a view of the coupler of FIG. 7 rotated 90 degrees.

As one further alternative embodiment, attention is directed to FIGS. 7 and 8 wherein a tubular constructed coupler 30 is shown, in contrast to the planar members described above. This coupler is used in essentially the same fashion as the foregoing coupler 2, with the one cord end 4 coupling to an end aperture 32, while the opposite cord end mounts through the center bore 34 of the coupler body 36. Upon drawing the cord tight, the tag end 6 is again wrapped into the notches 38 let into the opposite walls of the body member 36 before being tucked through the open window 40 and out the lower end of the coupler via the bore 34. In lieu of an open window 40 between the notches 38, either a separate aperture, like aperture 32, might be provided or an inverted L-shaped channel might be longitudinally let into the body 36 to create a flange behind which the tag end can be constrained. As is to be appreciated, however, the coupler 30 also confines the rope ends and coupler to one another along the longitudinal axis of the coupler to minimize movement in the wind.

While the invention has been described with respect to its presently preferred and various alternative embodiments, along with various modifications thereto, it is to be appreciated still other constructions might suggest themselves to those of skill and the art. Accordingly, it is contemplated the following claims should be interpreted to include all those equivalent embodiments within the spirit and scope thereof.

What is claimed is:

1. A cordage coupler comprising:
   (a) a rigid planar body having an outer periphery which relative to a longitudinal center axis provides for a first end whereat the peripheral edges taper inward to said longitudinal center axis as the edges extend forward, a mid-section wherein the peripheral edges are generally parallel and a relatively blunt, arcuate second end;
   (b) a first through aperture in said first end adjacent said longitudinal axis;
   (c) a plurality of V-shaped notches lengthwise staggered relative to one another along opposite sides of said mid-section, wherein opposite facing surfaces of each notch include a relatively thin coextensive beveled region;
   (d) a closed loop arm transversely projecting from a front surface of said body at said second end and having a bore parallel to said longitudinal axis; and
   (e) wherein a first cordage member end is securable to said first aperture and a second cordage member end length adjustably mounts through said bore and said first aperture before being wrapped about a rear surface of said body and itself at each of said notches and passed back through said bore.

2. Apparatus as set forth in claim 1 including a second aperture at said second end and wherethrough the tag end of a cord wrapped about said body and into said notches may be passed between the front and rear surfaces.

3. Apparatus as set forth in claim 1 wherein the beveled region of each notch exhibits a projecting inverted V-shape.

4. A cordage coupler comprising:

(a) a rigid planar body having an outer periphery which relative to a longitudinal center axis provides for a first end whereat the peripheral edges taper inward to said longitudinal center axis as the edges extend forward, a mid-section wherein the peripheral edges are generally parallel and a relatively blunt, arcuate second end;
(b) a first through aperture in said first end adjacent said longitudinal axis;
(c) a second elongated through aperture in said second end transverse to said longitudinal axis;
(d) a plurality of V-shaped notches lengthwise staggered relative to one another along opposite sides of said mid-section, wherein facing surfaces of each notch include a projecting, co-extensive, inverted V-shaped beveled region;
(e) a closed loop arm transversely projecting from a front surface of said body at said second aperture to form a bore parallel to said longitudinal axis; and
(f) wherein a first cordage member end is securable to said first aperture and a second cordage member end length adjustably mounts through said bore and said first aperture before being wrapped about a rear surface of said body and itself at each of said notches and passed back through said bore.

5. A cordage coupler comprising:
(a) a tubular body having a lengthwise bore;
(b) a first aperture extending through said body to said bore at one end of said body;
(c) a second aperture extending through said body to said bore;
(d) a plurality of V-shaped notches formed through the body and transversely opening to said bore in staggered lengthwise relation from opposite outer surfaces of said body and generally intermediate said first and second apertures; and
(f) wherein a first cordage member end is securable to said first aperture and a second cordage member end length adjustably mounts through said first aperture before being wrapped about the outer surface of said body and itself at each of said notches and passed through said second aperture to exit from said bore.

6. Apparatus as set forth in claim 5 wherein said second aperture is in communication with each of said plurality of notches.

* * * * *